United States Patent [19]

Watts

[11] Patent Number: 4,812,240

[45] Date of Patent: Mar. 14, 1989

[54] PROCESS FOR TREATING WASTE WATER CONTAMINATED WITH MANGANESE

[75] Inventor: Lawrence E. Watts, Quakertown, Pa.

[73] Assignee: Quaker Chemical Corporation, Conshohocken, Pa.

[21] Appl. No.: 228,996

[22] Filed: Aug. 5, 1988

[51] Int. Cl.$^4$ .............................................. B01D 13/00
[52] U.S. Cl. ..................................... 210/639; 210/651
[58] Field of Search .................... 210/639, 651; 134/3, 134/28, 41

[56] References Cited

U.S. PATENT DOCUMENTS 4,014,787  3/1977  Shorr ............................... 210/651 X
4,707,273  11/1987  Halterman .......................... 210/724

Primary Examiner—Frank Spear
Attorney, Agent, or Firm—Panitch Schwarze Jacobs & Nadel

[57] ABSTRACT

Manganese is removed from an aqueous waste stream by adding a water-soluble lignosulfonate salt to the waste stream and passing the lignosulfonate-treated waste stream through an ultrafilter thereby producing a purified effluent stream.

6 Claims, No Drawings

PROCESS FOR TREATING WASTE WATER CONTAMINATED WITH MANGANESE

BACKGROUND OF THE INVENTION

1. Field of the Invention

This invention relates to a process for the removal of manganese (II) ion contamination from waste water. More specifically, it relates to a process for the removal of manganese (II) ion from waste water generated during the processing of aluminum and its alloys.

2. Description of the Related Art

The cleaning of metals is a prerequisite operation prior to the application of surface treatments such as the deposition of organic or electroplated coatings since the durability of such coatings depends very heavily on the cleanliness of the metal surface prior to the application of the coating. Methods that are utilized to achieve a clean metal surface prior to such surface treatment operations include solvent cleaning, vapor degreasing, washing with aqueous surfactant solutions, and chemical cleaning with aqueous solutions of acid or alkali or a combination of any of these methods. Cleaning metal surfaces with aqueous acid or alkali is accomplished by washing away dirt and organic contaminants and by chemical reaction of the surface with the acid or alkali whereby a fresh, clean metallic surface is produced. The acid or alkali oxidizes the atoms on the surface of the metal thereby producing a clean metallic surface. The oxidation of the surface atoms also produces ions which dissolve in the aqueous acid or alkaline solution. Therefore, the wastestream from the aqueous acid or alkaline cleaning will contain various types and amounts of heavy metal ions depending upon the type of alloy being cleaned. The cleaning of aluminum is an example of an operation that has the potential for creating heavy metal contamination of wastewater since practically all aluminum that is fabricated is alloyed with heavy metals. Aluminum is alloyed with certain metals because, in its pure state, it is a relatively soft metal that tends to self-anneal and lose strength. Pure aluminum has a yield strength of only 5,000 lbs. per square inch and a tensile strength of 13,000 lbs. per square inch. These mechanical strengths are too low for the many working operations that aluminum must undergo. High strength alloys have been developed which allow aluminum to be worked in the manifold applications in which it is used today. The chief alloying constituents added to aluminum are copper, magnesium, silicon, manganese, nickel and zinc. These elements are, therefore, likely to be present in wastestreams from the aqueous acid or alkaline cleaning of aluminum alloys. The presence of heavy metals in wastewaters from metal working and manufacturing facilities has prompted measures by state and federal regulatory agencies to regulate the heavy metal content of effluent streams.

For example, the Federal Environmental Protection Agency (EPA) has established effluent limitations and standards limiting the discharge of pollutants into navigable waters and into publicly owned treatment works by existing and new plants engaged in the manufacturing of cans. These regulations apply only to the manufacture of seamless cans since no process wastewater is generated from the manufacture of seamed cans. Seamless cans consist of a can body formed from a single piece of metal and usually a top, or two ends, that are formed from sheet metal attached to the can body. There are several forming methods which may be used to shape the can bodies including simple drawing, drawing and redrawing, drawing and ironing (D&I), extruding, spinning, and others. In the manufacture of seamless cans, oil is used frequently as a lubricant during the forming of the seamless body and must be removed before further processing can be performed. Typically, this is accomplished by washing the can body in a continuous canwasher using water based cleaners. This step is followed by metal surfacing steps to prepare the can for painting.

The washing process generates about 30 gallons of wastewater per 1000 cans that must be treated in order to meet the EPA standards. The principal pollutants that must be removed via waste treatment methods include heavy metal ions such as aluminum, chromium, copper, iron, manganese in addition to fluoride ions and organic matter such as lubricating oils and the like.

There have been a number of approaches to the problem of the treatment of waste waters from the manufacture of seamless aluminum cans in order to meet the EPA standards. Changes in the can cleaning processes to recycle canwasher rinse waters have been effective in reducing the total volume of effluent. Oil, grease and other organic pollutants have been removed by skimming, chemical emulsion breaking, dissolved air floatation or a combination of these methods. Heavy metal ions have been removed principally by precipitation of the corresponding hydroxides followed by sedimentation of the precipitate. This method has been found to be acceptable for most metals, but is not satisfactory for lowering manganese levels to the standards set by the EPA. Calculations based on solubility product constant for manganese hydroxide show that the manganese ion concentration falls within the EPA standards only when the pH of the effluent is about 11.0, a pH too high for the effluent to be discharged. The relatively high pH required to precipitate the manganese also complicates fluoride ion precipitation. The fluoride ion is precipitated as calcium fluoride, a salt that is soluble in a solution whose pH is 11 or greater. Some can manufacturers attempted to meet the EPA standards for fluoride emissions by changing from an acid to an alkaline cleaning process. The acid cleaning process employs fluoride ion in the aqueous cleaning bath in order to etch the metal surface by forming an aluminum fluoride complex. In an alkaline cleaning process, the aluminum surface is vigorously attacked by the hydroxide ion thereby obviating the need for fluoride ion.

The switch to alkaline cleaning, however did not solve the manganese effluent problem. Attempts to treat these aqueous waste effluents to lower the manganese levels to the EPA standards have not been completely successful or are cumbersome and require a number of operations. For example, U.S. Pat. No. 4,707,273 issued to Halterman et al discloses a multi-step method for the removal of manganese from either an acid fluoride washing process or an alkali washing process. The process involves:

(a) adding a sufficient amount of phosphate ion to the effluent to react with the manganese and fluoride;

(b) adjusting the pH of the phosphate-treated effluent to a pH of about 2.0 to 3.0 when the pH of the effluent is outside this range;

(c) adding a sufficient amount of calcium ion to react with the manganese, fluoride, and phosphate and form a calcium-manganese-phosphate complex and a calcium-phosphate-fluoride complex;
(d) adjusting the pH of the calcium-treated effluent to about 7.0 to 9.0 when the pH of this effluent is outside this range to co-precipitate the manganese and fluoride complexes and produce a purified effluent containing less than about 50 ppm fluoride ion; and
(e) separating the precipitate from the effluent; wherein the ratio of added phosphate ion to added calcium ion is about 3:1 to 1:2.5.

The patent also discloses a method for the removal of manganese and other heavy metals from the aqueous waste effluent containing 0.5 to about 5 ppm manganese from an alkali wash step in the manufacture of aluminum or tin cans comprising
(a) adding a sufficient amount of phosphate ion to react with the manganese;
(b) adjusting the pH of the phosphate-treated effluent to a pH of about 2.0 to 3.0 when the pH of the effluent is outside this range;
(c) adding a sufficient amount of calcium ion to react with the manganese and phosphate to form a calcium-manganese-phosphate complex;
(d) adjusting the pH of the calcium-treated effluent to about 7.0 to 9.0 when the pH of this effluent is outside this range to precipitate the complex and produce a purified effluent containing less than about 0.60 ppm manganese; and
(e) separating the precipitate from the effluent; wherein the weight ratio of added phosphate ion to added calcium ion is about 3:1 to 1:2.5.

The methods disclosed in the Halterman patent require a number of operations including forming a precipitate and separating the precipitate from the supernatant to produce an effluent that contains less than about 0.60 ppm manganese ion.

SUMMARY OF THE INVENTION

In accordance with the present invention there is provided a process for treating wastewater containing from about 0.2 ppm to about 20 ppm manganese (II) ion comprising the steps of:
(a) adding to said wastewater an amount of a water-soluble lignosulfonate salt sufficient to form a manganese (II) ion-lignosulfonate complex to provide a manganese (II) ion-lignosulfonate wastewater mixture;
(b) separating said manganese (II) ion-lignosulfonate complex from said mixture by passing said mixture through an ultrafilter, said ultrafilter including a semi-permeable membrane having a pore size effective to prevent the passage of said manganese (II) ion lignosulfonate complex through said membrane to provide a permeate containing less than 0.2 ppm manganese (II) ion.

The process of this invention does not involve multiple operations requiring changes in the pH of large volumes of aqueous waste effluent nor does it consist of separating and disposal of voluminous heavy metal hydroxide precipitates. The process of the present invention is based upon the principles of ultrafiltration which is a pressure-driven separation process occurring on a molecular scale. More specifically, a liquid containing small solute molecules, large solute molecules, colloids, and suspended solids is forced through a porous membrane. The liquid and the smaller solute molecules pass through the pores of the membrane while the larger solute molecules, colloids, and suspended solids are retained. Those components that do not pass through the membrane are collectively called the retentate. Those substances that pass through the membrane are collectively termed the permeate.

In the ultrafiltration process, a particular substance can be recovered or concentrated in the retentate thereby producing a purified permeate in either a batch or continuous process. It is for this reason that ultrafiltration is very useful in waste treatment operations.

Effluent streams containing acceptable levels of pollutants can be produced by passing an aqueous waste stream through an ultrafilter having a membrane of the appropriate pore size for retaining substances that must be excluded from an effluent stream. The pollutants are retained by the membrane and concentrate in the retentate. The retentate, which is only a fraction of the volume of the original aqueous waste stream, can then be disposed of in a much more efficient and economical manner.

It is an object of the present invention to provide a process for the efficient reduction of manganese (II) ion in an aqueous waste stream to acceptable emission levels. It is also an object of the present invention to provide a process for reducing manganese (II) ion levels in aqueous waste streams using ultrafiltration. It is a further object of the present invention to provide a simple and efficient method of reducing manganese (II) ion levels in aqueous effluents from can manufacturing plants to the standards set by the EPA.

DETAILED DESCRIPTION OF THE INVENTION

In accordance with the present invention there is provided a process for treating wastewater which reduces the manganese (II) ion concentration from about 20 ppm to about 0.1 or less.

The process of the present invention is the result of the unexpected discovery that the addition of a water-soluble lignosulfonate salt to an aqueous waste stream containing manganese (II) ion significantly reduces the manganese (II) ion concentration in the permeate of an ultrafilter positioned downstream of the lignosulfonate salt addition point. While not wishing to be bound by theory, the present inventor believes that a water-soluble manganese (II) ionlignosulfonate (Mn-Ls) complex is formed in the aqueous waste stream upon the addition of the water-soluble lignosulfonate salt. When the aqueous waste stream containing the Mn-Ls complex is introduced into an ultrafilter, the Mn-Ls complex, being too large to pass through the pores of the membrane, is retained in the retentate.

It is well known in the art that heavy metals such as iron, copper and manganese are complexed by lignosulfonate [Tappi 56 (7) 105 (1973)].

It is also well known in the art that lignosulfonate can have a molecular weight of from about 250 to 25 million daltons. (Kirk-Othmer, Enclopedia of Chemical Technology, 3rd Edition, Vol. 22 p. 306). Therefore, a Mn-Ls complex could have a molecular weight ranging from 305 daltons for a complex between manganese (II) ion and one lignosulfonate ligand to multiples of over 25 million daltons for complexes between manganese (II) ion and multiple lignosulfonate ligands. Therefore, the process of the present invention is applicable to a variety of manganese (II) ion levels, lignosulfonate concentrations and pore sizes of the membranes in an ultrafilter. For example, since lignosulfonate is a polydispersed natural product, that is, a sample of it contains a distribution of molecular weights, membranes with a variety of pore sizes are effective in preventing the passage of the Mn-Ls complex through the membrane and into the permeate. The lignosulfonate salt can be any water-soluble lignosulfonate salt including ammonium lignosulfonate, calcium lignosulfonate, sodium lignosulfonate, and calcium-sodium lignosulfonate.

Obviously, the lignosulfonate concentration and membrane pore size are interrelated and must be determined on a case-by-case basis.

Since the molecular weight distribution between samples of lignosulfonate salt vary, the effective amount in each application will vary. The effective amount of lignosulfonate salt is determined by adding it to an aqueous waste stream until the desired concentration of manganese (II) ion is reached in the permeate emanating from an ultrafilter downstream from the lignosulfonate salt addition point. In a preferred embodiment of the present invention, a lignosulfonate salt is added to an aqueous waste stream from an acid aluminum cleaning process in an amount sufficient to lower the manganese (II) ion concentration in the permeate of an ultrafilter located downstream from the lignosulfonate addition point to a desired level. The acid aluminum cleaning process can be any process that cleans an aluminum surface by reaction of the aluminum with aqueous acid. Such aqueous acids include phosphoric, sulfuric, chromic, hydrofluoric, hydrochloric, nitric and mixtures thereof. These acid cleaning treatments are used to clean an aluminum surface prior to the application of organic coatings and electroplated coatings. Typical acid cleaning processes include acid aluminum can cleaning and acid cleaning of all types of aluminum surfaces prior to the application of an organic coating or anodizing.

In another preferred embodiment of the present invention, a lignosulfonate salt is added to an aqueous waste stream from an alkaline aluminum cleaning process in an amount sufficient to lower the manganese (II) ion concentration in the permeate of an ultrafilter located downstream from the lignosulfonate addition point to a desired level. The alkaline aluminum cleaning process can be any process that cleans an aluminum surface by reaction of the aluminum with aqueous alkali. Such aqueous alkali includes aqueous solutions of alkali and alkaline earth metal hydroxides, carbonates, silicates and phosphates. These alkaline cleaning treatments are used to clean an aluminum surface prior to the application of organic coatings and electroplated coatings. Typical alkaline cleaning processes include alkaline aluminum can cleaning and alkaline cleaning of all types of aluminum surfaces prior to anodizing. In a most preferred embodiment of the present invention, from about 0.001% to about 1.0% of a lignosulfonate salt is added to the alkaline cleaning stage of an aqueous alkaline cleaning process for aluminum cans. The effluent from the cleaning stage is first treated to adjust the pH to a value of between 9.0 and 10.0 and then fed to an ultrafilter having a membrane which has a molecular weight retention range of from about 100,000 to about 500,000 daltons.

The permeate from the ultrafilter contains a manganese (II) ion concentration below 24.3 grams of manganese (II) ion per million cans produced, the maximum monthly average effluent limitation established by the EPA. (Federal Register Vol. 48, #223, pg 52400, Nov. 17, 1983).

The following examples serve to illustrate the present invention and are not meant to limit it.

EXAMPLE 1.

A manufacturing facility involved in the production of seamless aluminum cans had weekly average manganese (II) ion concentrations in the permeate of an ultrafilter downstream of the can washer line ranging from 33.52 to 113.79 grams of manganese (II) ion per million cans before the introduction of calcium lignosulfonate into the alkaline cleaning stage of the can washer line. Approximately 0.002% by weight of calcium lignosulfonate was added to the alkaline cleaning bath of the can washer line. The calcium lignosulfonate concentration was maintained at about 0.002% by weight for a period of four weeks. The weekly average manganese (II) ion concentration in the permeate of an ultrafilter downstream of the can washer line ranged from 23.19 to 3.05 grams of manganese (II) ion per million cans. The calcium lignosulfonate was then allowed to dissipate from the alkaline cleaning stage and the manganese (II) ion concentration in the ultrafilter permeate returned to approximately the same levels as before the addition of the calcium lignosulfonate. The data is listed in Table I.

TABLE I

EFFECT OF CALCIUM LIGNOSULFONATE ON MANGANESE (II) LEVELS IN AQUEOUS EFFLUENT FROM AN ALUMINUM CAN WASHING LINE.

Weekly Average - Grams of Manganese (II) ion per $10^6$ cans in Ultrafilter Permeate

| Week | CaLS* in Alkaline Cleaner Stage | 0.002% CaLS in Alkaline Cleaner Stage | After Removal of CaLS from Alkaline Cleaner Stage |
|---|---|---|---|
| 1 | 58.12 | 23.19 | 18.28 |
| 2 | 53.84 | 11.99 | 12.99 |
| 3 | 33.52 | 4.40 | 163.54 |
| 4 | 78.16 | 3.05 | 56.73 |
| Monthly Average | 55.91 | 10.65 | 62.88 |

*CaLS = Calcium lignosulfonate

EXAMPLE II

The can manufacturing facility of example I combined the waste water from an alkaline aluminum can washer line utilizing 0.002% by weight calcium lignosulfonate in the alkaline cleaning stage with the waste water from an alkaline aluminum can washer line that did not utilize calcium lignosulfonate in the alkaline cleaning stage. Before the use of calcium lignosulfonate, the weekly average manganese effluent concentration expressed in grams of manganese per 106 cans produced ranged from 55.92 to 81.06. After the addition of the calcium lignosulfonate to the alkaline cleaning stage of one of the washer lines the weekly average manganese effluent concentration of the combined effluent ranged from 5.02 to 37.30 grams of manganese per 106 cans produced. The data are listed in Table II.

TABLE II

EFFECT OF CALCIUM LIGNOSULFONATE ON MANGANESE (II) LEVELS IN COMBINED AQUEOUS EFFLUENT FROM TWO ALUMINUM CAN WASHING LINES.
Weekly Average - Grams of Manganese (II) ion per $10^6$ cans in Ultrafilter Permeate

| Week | 0% CaLS* in Alkaline Cleaner Stage of First & Second Washer Lines | 0.002% CaLS in Alkaline Cleaner Stage of Second Washer LIne Only |
|---|---|---|
| 1 | 67.93 | 37.30 |
| 2 | 81.06 | 33.15 |
| 3 | 55.92 | 5.02 |
| 4 | 29.96 | 21.48 |
| Monthly Average | 58.71 | 24.23 |

*CaLS* = Calcium lignosulfonate
NOTE - both Lines produced approximately equal numbers of cans.

EXAMPLE III

When the alkaline cleaning stages of all of the washer lines in the can manufacturing facility of Example I contained about 0.002% by weight calcium lignosulfonate the weekly average manganese effluent concentrations expressed in grams of manganese per $10^6$ cans ranged from 5.95 to 12.37 over a six week period. The data is listed in Table III.

TABLE III

EFFECT OF CALCIUM LIGNOSULFONATE ON MANGANESE (II) LEVELS IN AQUEOUS EFFLUENT FROM ALL ALUMINUM CAN WASHING LINES.
Weekly Average - Grams of Manganese (II) in per $10^6$ cans in Ultrafilter Permeate

| Week | 0.002% CaLS* in Alkaline Cleaning Stage of All Washers |
|---|---|
| 1 | 9.92 |
| 2 | 6.44 |
| 3 | 12.37 |
| 5 | 11.84 |
| 6 | 5.95 |
| Six Week Average | 8.96 |

*CaLS = Calcium Lignosulfonate

What is claimed is:

1. A process for treating wastewater containing from about 0.2 ppm to about 20 ppm manganese (II) ion comprising the steps of:
    (a) adding to said wastewater an amount of a water-soluble lignosulfonate salt sufficient to form a manganese (II) ion-lignosulfonate complex to provide a manganese (II) ion-lignosulfonate wastewater mixture;
    (b) separating said manganese (II) ion-lignosulfonate complex from said mixture by passing said mixture through an ultrafilter, said ultrafilter including a semi-permeable membrane having a pore size effective to prevent the passage of said manganese (II) ion-lignosulfonate complex through said membrane to provide a permeate containing less than 0.2 ppm manganese (II) ion.

2. The process of claim 1 wherein said water-soluble lignosulfonate salt is selected from the group consisting of ammonium lignosulfonate, calcium lignosulfonate, sodium lignosulfonate, or calcium-sodium lignosulfonate.

3. The process of claim 1 wherein said water-soluble lignosulfonate salt is calcium lignosulfonate.

4. A process for preventing the manganese (II) ion concentration from exceeding 0.20 ppm in wastewater from an aqueous alkaline cleaning operation in the manufacture of aluminum cans comprising the steps of:
    (a) maintaining from about 0.001% to about 1.0% by weight of a water-soluble lignosulfonate salt in an aqueous alkaline cleaner, said lignosulfonate salt forming a manganese (II) ion-lignosulfonate complex as the manganese (II) ion is produced from the reaction of the alkaline cleaner and the surface of said aluminum cans, to provide a manganese (II) ion-lignosulfonate complex aqueous alkaline cleaner mixture;
    (b) separating said manganese (II) ion-iignosulfonate complex from said mixture by passing said mixture through an ultrafilter, said ultrafilter including a semi-permeable membrane having a pore size effective to prevent the passage of said manganese (II) ion-lignosulfonate complex through said membrane to provide a permeate containing less than 0.2 ppm manganese (II) ion.

5. The process of claim 4 wherein said water-soluble lignosulfonate salt is selected from the group consisting of ammonium lignosulfonate, calcium lignosulfonate, sodium lignosulfonate, or calcium-sodium lignosulfonate.

6. The process of claim 4 wherein said water-soluble lignosulfonate salt is calcium lignosulfonate.

* * * * *